(12) United States Patent
Schäfer et al.

(10) Patent No.: US 11,721,362 B2
(45) Date of Patent: Aug. 8, 2023

(54) TAPE DRIVE TENSION MANAGEMENT

(71) Applicant: International Business Machines Corporation, Armonk, NY (US)

(72) Inventors: Markus Schäfer, Heiligenmoschel (DE); Stefan Wiedemann, Kaiserslautern (DE); Erik Rueger, Ockenheim (DE); Robert Beiderbeck, Wassenberg (DE); Ole Asmussen, Henstedt-Ulzburg (DE)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/644,460

(22) Filed: Dec. 15, 2021

(65) Prior Publication Data

US 2023/0186949 A1 Jun. 15, 2023

(51) Int. Cl.
*G11B 15/43* (2006.01)
*G11B 5/52* (2006.01)
*G11B 15/467* (2006.01)

(52) U.S. Cl.
CPC .............. *G11B 15/43* (2013.01); *G11B 5/52* (2013.01); *G11B 15/4678* (2013.01)

(58) Field of Classification Search
CPC ......... G11B 5/093; G11B 15/66; G11B 15/48; G11B 15/46; G11B 15/43; G11B 2220/90; G11B 15/54
USPC ...................................... 360/71, 73.14, 74.3
See application file for complete search history.

(56) References Cited

U.S. PATENT DOCUMENTS

| 4,943,874 A | 7/1990 | Takeda |
| 5,125,592 A | 6/1992 | Sato |
| 5,808,824 A * | 9/1998 | Kaniwa ................. G11B 15/46 360/73.14 |
| 9,934,812 B2 * | 4/2018 | Fasen ................... G11B 15/093 |
| 10,347,282 B2 | 7/2019 | Pantazi |
| 2004/0129818 A1 | 7/2004 | Sugawara |
| 2007/0131811 A1 * | 6/2007 | Biskeborn ............. G11B 15/43 242/334.6 |
| 2012/0305692 A1 * | 12/2012 | Suzuki ................. G11B 15/66 242/348 |

(Continued)

FOREIGN PATENT DOCUMENTS

| EP | 439366 A2 | 7/1991 |
| EP | 782136 A1 | 7/1997 |

(Continued)

OTHER PUBLICATIONS

Cherubini et al., "Near-Optimal Tape Transport Control with Feedback of Velocity and Tension," Science Direct, Elsevier, IFAC-PapersOnLine 49-21 (2016) 019-025, pp. 1-7.

*Primary Examiner* — Nabil Z Hindi
(74) *Attorney, Agent, or Firm* — Kelsey M. Skodje

(57) ABSTRACT

A tape drive includes a plurality of rollers, a head, a tension sensor, and control circuitry. The rollers are spatially arranged within the tape drive to define a route for tape of a received data cartridge to travel from the received data cartridge to a tape reel. The head includes read elements and write elements configured to read from and write to the tape as tape of the received data cartridge travels along the route. The tension sensor is configured to measure tension of the tape as it travels along the route. The control circuitry is configured to cause a motor to impact the tension to keep the tape within a tension threshold.

20 Claims, 8 Drawing Sheets

(56) References Cited

U.S. PATENT DOCUMENTS

2015/0124348 A1    5/2015  Bui
2016/0125909 A1    5/2016  Fasen
2018/0374508 A1*  12/2018  Pantazi .................. G11B 15/48

FOREIGN PATENT DOCUMENTS

FR        2264353  B1   11/1980
FR        2476363  A1    8/1981
JP       61034756  A     2/1986

* cited by examiner

TAPE DRIVE TENSION MANAGEMENT

BACKGROUND

Tape drives are computer storage devices that read data from and write data to magnetic tape. Performance of tape drives tends to increase when a tension of the tape increases during operation. For example, the capacity of a tape drive can increase by 50% by factors such as increasing the tension on the tape. There is therefore a desire to ensure that a relatively high amount of tension on the tape is maintained.

SUMMARY

Aspects of the present disclosure relate to a tape drive, method, system, relating to managing the tension of tape within a tape drive. For example, the tape drive includes a plurality of rollers, a head, a tension sensor, and control circuitry. The rollers are spatially arranged within the tape drive to define a route for tape of a received data cartridge to travel from the received data cartridge to a tape reel. The head includes read elements and write elements configured to read from and write to the tape as tape of the received data cartridge travels along the route. The tension sensor is configured to measure tension of the tape as it travels along the route. The control circuitry is configured to cause a motor to impact the tension to keep the tape within a tension threshold.

For another example, the method includes receiving a data cartridge into a tape drive. The tape drive includes a plurality of rollers spatially arranged within the tape drive to define a route. The route extends from the received data cartridge to a tape reel of the tape drive such that tape of the data cartridge travels along the route past a head with read elements and write elements. The method also includes measuring, using a tension sensor of the tape drive, a tension of the tape as it travels along the route. The method also includes causing, by control circuitry of the tape drive and in response to sensing the tension, a motor of the tape drive to impact the tension to keep the tape within a tension threshold. A system and computer product configured to perform the above method are also disclosed.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
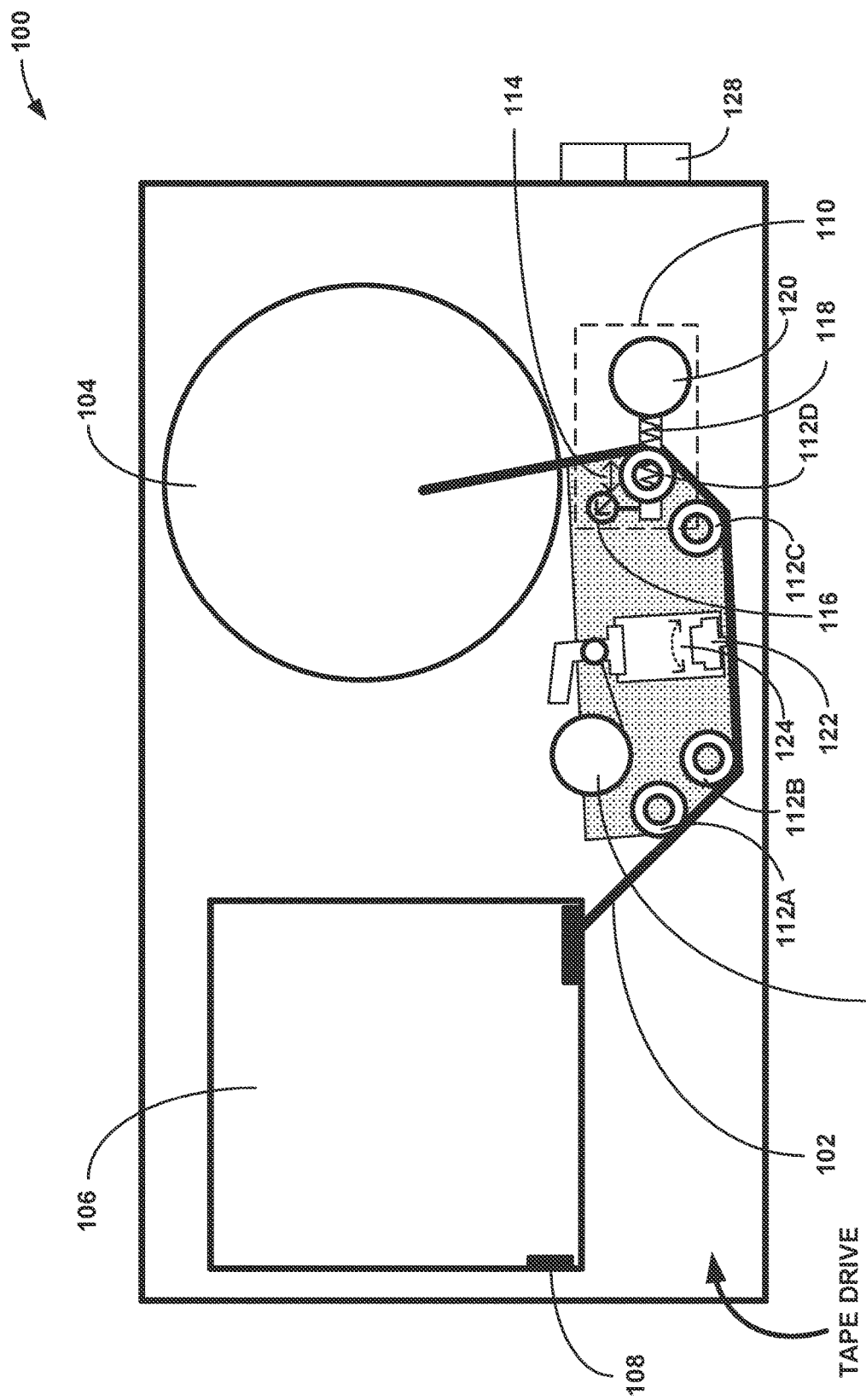
FIG. 1 depicts a conceptualized schematic internal view of a tape drive configured to measure the tension of a tape and modulate the tension of the tape via an adjustable roller adjacent the tape reel.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to managing the tension level on the tape of a tape drive, while more particular aspects of the present disclosure relate to using a tape drive tension controller that can detect the tension of the tape and move independent of the rest of the tape drive to maintain a tape tension. While the present disclosure is not necessarily limited to such applications, various aspects of the disclosure may be appreciated through a discussion of various examples using this context.

In conventional tape drive systems, tape is analyzed prior to being shipped out to identify a preferred tension of the tape. This identified tension of a conventional tape drive system may be dependent on such factors as the type of tape that is used, the drive firmware that is used, or the like. A goal of conventional tape drive systems is to find the maximum tension that is possible with the provided cartridge without data loss, where such efforts can notably increase the amount of capacity of a given tape cartridge.

However, one problem of conventional tape drive systems is that a temperature and humidity may cause the tape to physically deform, such as to be stretched such that the transverse dimensional stability (TDS) is lost (e.g., where TDS is preferably stable/static to maintain performance). Physical deformation of the tape in this way tends to result in data loss, as it may be difficult or impossible to read the data on the tape follow such deformation. Moreover, conventional tape drive systems typically lack a system to detect such data loss until a subsequent read attempt, as there might not be a detectable error that occurred during the write operation. As would be understood by one of ordinary skill in the art, it is often disadvantageous to be unaware of a failed write of a piece of data for any period of time, as someone might count on the failed write of that data during that period of time, such as by overwriting/deleting/etc. other versions of that data during that period of time. For example, sometimes tape storage is used as long term backup data source, such that it is only brought up to recover archival data, and therefore there may be no good backup to the tape data when the tape data is lost.

Another problem of conventional tape drive systems is that in an effort to maximize the tension of the tape, in some instances the tape tension gets too high for the tape to stay properly attached to the leader pin, such that the leader pin breaks. Given that this leader pin is an industry standard component, this is a problem that functionally must be solved by alteration of other components of the tape drive (rather than modification to the leader pin). Fixing a broken leader pin is a significant problem, as it can take a significant amount of time getting the tape properly attached to a leader pin once detached.

Beyond this, one reasons that conventional tape drive systems suffer from broken leader pins is that the control mechanism of conventional tape drive systems is not circuit controlled (e.g., there is no feedback into the control mechanism to inform the control mechanism that a leader pin break might be imminent unless something is changed). Furthermore, while the tape of data cartridges is ideally tightly and uniformly wound within each data cartridge, realistically the tape of some data cartridges is loosely wound with some slack in the tape. This results in the threader arm of the leader pin assembly of conventional tape drive systems being able to gain more than a planned amount of speed/momentum before coming to the end of this slack. This can result in a "jolt" to the leader pin that the leader pin is not designed to repeatedly endure (and, as discussed, it is not feasible to redesign the leader pin such that the leader pin would be robust enough such that this jolting force was not a concern).

Furthermore, once a data cartridge is successfully loaded, a conventional tape drive system typically attempts to acquire a predetermined tension by a first motor in the tape reel and a second motor in the data cartridge working in conjunction. Specifically, the required motor force that both must apply in conjunction is typically defined by microcode based on, e.g., drive hardware, cartridge type, code level installed, and the like. As such, conventional tape drive systems require the two motors to work together in dependence based on predetermined rules to achieve and maintain a preferred tension.

However, such an approach requires numerous component pieces all being (and staying) in tight tolerance, and therein requires very minimal inaccuracy on all levels to avoid issues. For example, such an approach (where these two motors are tested and then shipped out to theoretically forever work in conjunction based on the static microcode) fails to account for motor magnetics, gear shifts, encoder pulsing, electronics, or the like that often play a role in the combination of two motors. For example, the power error signal (PES) may become too high if motors start operating at unexpected speeds and/or tensions (e.g., where tension impacts the motor resonance). The failure to account for these factors once in use makes conventional tape drive systems susceptible for errors and inaccuracy when attempting to achieve and maintain a preferred tension, where this propensity for errors and inaccuracy grows over time. Moreover, as a result of all of these issues with acquiring/maintaining a satisfactorily high tension, conventional tape drive systems are typically afforded two choices: either attempt to maximize performance by increasing tension (but therein risking the tape breaking or tension becoming unworkable at high speeds), or are configured to stay well below a tension that may cause such negative effects (but therein notably reduce performance by staying below a preferred tension).

Aspects of this disclosure relate to solving or otherwise addressing these technical shortcomings of conventional tape drive systems. For example, aspects of this disclosure relate to a tape drive tension controller that can sense a tension of the tape and change the tension dynamically as the tape travels through the tape drive, such as by changing a route of the tape through the tape drive assembly. The tape drive tension controller (hereinafter referred to as a "tension controller") may manage the tension in the tape according to thresholds and specifications of the tape.

For example, the tension controller may move one or more rollers that are spatially arranged within the tape drive to define a different route of the tape, where changing the route of the tape changes the tension of the tape. Specifically, the tension controller may change the route such that the tape has either a longer or shorter route to travel between the data cartridge and the internal tape reel of the tape drive. This roller may be moved via a spring coupling the roller to a motor. As a result of the spring that is coupling the roller to the motor, tension peaks of the tape during operation (e.g., points at which the tension on the tape suddenly is relatively high or low) may be reduced or eliminated. The reduction/elimination of tension peaks may itself reduce or eliminate the possibility of tape deforming, and/or some portion of the tape breaking. For example, this spring may be configured to absorb the aforementioned jolt that may occur when a loaded data cartridge has some slack that causes a too-fast traversal of the tape drive by the tape until the tape suddenly hits the end of this slack (e.g., therein minimizing the chance that the leader pin may experiencing structural issues or a break from repeated exposure to this jolt). Further, as soon as the leader pin passes the roller that is spring-coupled to the motor, aspects of this disclosure are related to the assembly "taking over" and making fine adjustments in order to mitigate any inaccuracies (e.g., manufacturing inaccuracies, or slippages across tolerances due to standard use/aging of components of the tape drive) of the components of the tape drive.

The spring coupling between the roller and the motor may further enable and/or ensure a relatively consistent tension during read/write operations to the full length of the tape to reduce the likelihood of the tape wrapping itself loosely within the tape drive following a read/write operation. As would be understood by one of ordinary skill in the art, ensuring and/or enable a proper wrapping of the tape (and therein reducing the likelihood of a loose wraps) may itself reduce a likelihood of the tape breaking (by reducing the possibility of jolts as discussed herein at a subsequent unraveling), and improve a likelihood that the tape tension will be within the provided parameters (which includes maintaining a TDS to prevent stretched tapes, which may itself cause data loss).

In some examples, aspects of the disclosure include a tension sensor that regularly measures the tension on the tape such that the tension controller may adjust the tension. The tension sensor may be pseudo-continually gathering tension readings, such as gathering a reading once every second, once every half second, once every tenth of a second, once every millisecond, etc. The tension controller may include a control circuit to adjust the tension on the tape in response to the measured tension using the roller. Specifically, the control circuit may adjust the tension by using the motor (and spring) to move the roller to a specific point along a predetermined path, where this point along this path is predicted (by the control circuit) to adjust the tension as needed.

Beyond this, aspects of this disclosure may relate to a control circuit (e.g., an additional control circuit, or the same control circuit as described above) that is configured to adjust the tape tension based on the head read/write performance. For example, this head control circuit may be configured to gather performance data from the read/write head and, in response to detecting read/write issues, adjust the tension using a motor/spring/roller. The first and/or second control circuit may be part of a tape tension control circuit implemented into the tape drive electronic board (e.g., one located at the "bottom" of the tape drive).

In this way, aspects of the disclosure may be configured to avoid the negative consequences of having too high of tension (the tape deforming, breaking, or becoming disengaged with the leader pin) while also avoiding the negative consequence of having too low of a tension (e.g., a lowered performance of the tape drive). Further, this utility should only increase in the future, as future generations of tape are predicted to be more sensitive to a proper tape tension as a higher capacity of tape devices may require the usage of tape that is configured to stretch more without limiting the TDS as discussed above. As such, the control circuits, motor, spring and roller make work together to increase TDS of the tape itself (e.g., by managing the tape tension to be in line with the predetermined specifications) while minimizing and/or preventing broken tape (e.g., by maintaining the tape tension below the tape breaking point) and increasing tape drive read/write performance and cartridge capacity.

For example, FIG. 1 depicts an internal view of an example tape drive 100. As depicted, tape drive 100 includes tape 102 that extends between internal tape reel 104 and data cartridge 106 that includes cartridge memory 108. Each of tape 102, tape reel 104, data cartridge 106, and cartridge memory 108 may be similar to such known components as would be understood by those of ordinary skill in the art.

As discussed herein, tape drive 100 may include tension controller 110 that is configured to manage a tension of tape 102. For example, tape 102 may travel between tape reel 104 and data cartridge 106 along a route that is defined by a plurality of rollers 112A-112D (collectively, "rollers 112"), where tape driver 110 is configured to move one roller 112D of these rollers 112 to modify a tension of tape 102. Tension controller 110 may be configured to move roller 112D back and forth along a predetermined path 114. Path 114 may be defined such that moving roller 112D in a first direction along path 114 increases a total length of the route that tape 102 has to take between tape reel 104 and data cartridge 106, and moving roller 112D in a second (opposite) direction decreases a total length of this route between tape reel 104 and data cartridge 106. Though much of the functionality of this disclosure is attributed to tension controller 110 (e.g., attributed to undepicted control circuits of tension controller 110) for purposes of discussion, it is to be understood that this functionality may be dispersed throughout components within (and without) tape drive 100 in arrangements that are consistent with this disclosure.

Tension controller 110 may manage the tension in tape 102 responsive to the measured tension of tape 102. Tension controller 110 may measure the tension of tape 102 via tension sensor 116. Tension sensor 116 may detect the tension of tape 102 in numerous ways. For example, tension sensor 116 may be coupled to roller 112D, and detect a tension of tape 102 by how roller 112D engages tape 102. Alternatively, or additionally, tension sensor 116 may be coupled to spring 118 that is itself attached to roller 112D, such that tension sensor 116 detects a tension of tape 102 via a tension of spring 118 as roller 112D engages tape 102 on spring 118. Tension sensor 116 may be mechanical in nature (e.g., such that tension sensor 116 includes a needle moving up a gauge in response to the tension increasing), where a signal is sent in response to any detected movement of a mechanical component that measures tension changes. In other examples, tension sensor 116 may include some other mechanism, such as a piezoelectric element that can provide an output voltage that corresponds to different detected tensions. Other types of tension sensor 116 that are capable of measuring a tension of tape 102 via other mechanisms that are consistent with this disclosure are also possible.

Tension controller 110 may move roller 112D via motor 120. Motor 120 may be any variety of motor that is capable of moving roller 112D while roller 112D is engaged with tape 102. Motor 120 may be capable of moving roller 112D whether tape 102 is under high tension or low tension when tape 102 is engaged with roller 112D.

For example, in use, when drive cartridge 106 is inserted into tape drive 100, a leader pin assembly (not depicted) may be configured to grab the leader pin of tape 102 as it sits in a housing of drive cartridge 106. The leader pin assembly as understood by one of ordinary skill in the art is configured to guide the leader pin of tape 102 out (along the route defined by rollers 112) to internal tape reel 104. This leader pin assembly is configured to guide the leader pin to tape reel 104 in a predetermined manner to achieve a predefined tension in tape 102 (e.g., where this predefined tension is determined by tape drive 100 and/or tape 102).

In some examples, tape 102 as it is housed within data cartridge 106 may be wound incorrectly (or otherwise suboptimally), such that when the leader pin assembly executes this operation to guide tape 102 to tape reel 104, the tension of tape 102 drops. For example, the tension of tape 102 as it is held between data cartridge 106 and tape reel 104 may drop a threshold amount below a range that has been determined to enable allowable read/write performance (e.g., reading for a device coupled to drive ports 128, and/or writing from a device coupled to drive ports 128), such that the new lower tension is expected to result in poor read/write performance.

As discussed herein, tension sensor 116 is configured to detect such a lowered tension, in response to which a request would be sent to motor 120 to move adjustable roller 112D to a new position calculated to raise the tension to a suitable tension. In some examples, tension sensor 116 may be configured to send this request to motor 120 and/or calculate this new position to which adjustable roller 112D is to be moved. In other examples, other circuitry or components of tension controller 110 may send this request, and/or calculate this new position. Raising the tension in this way might reduce the likelihood of broken leader pins and/or otherwise broken or damaged tape 102.

In other examples, based on the specific geometry of data cartridge 106 and/or tape drive 100, tape drive 100 may functionally require that data cartridge 106 is loaded in such a way that tape 102 of data cartridge 106 is immediately at a specified spatial load point within tape drive 100 (e.g., where this load point is a tape drive/tape condition where the leader pin is mounted at internal reel 104 and head 122 is properly at the begin of tape (BOT) position—when BOT is reached, this tape drive/tape configured is "ready at the load point"). Such a configuration may enable head 122 to be positioned (e.g., positioned along internal range 124 of movement) via motor 126 at a very beginning of tape 102. Head 122 is the component of tape drive that includes read/write elements as would be understood by one or ordinary skill in the art to facilitate reading data from tape 102 and writing data to tape 102. By enabling head 122 to read/write at a very beginning of tape 102, a utilization of tape 102 may be improved, leading to a subsequent performance improvement of tape drive 100.

However, a process that required such precise loading could lead to a long mount time and/or to load failures (and often does result in lengthy load times and load failures in conventional tape drive systems), due to the precision required to properly load data cartridge 106 in this way. Accordingly, tension controller 110 may be configured to manage tension of tape 102 to improve the positioning during this load procedure. For example, in response to a first attempt to position tape 102 at the load point that was unsuccessful, motor 120 can adjust roller 112D to cause a higher tape 102 tension and a "good" mount.

Beyond this, as discussed, tension controller 110 may improve the overall performance of tape drive 100 during read and/or write operations. For example, when tape drive 100 detects read or write issues, the firmware algorithm of tape drive 100 may be configured to attempt one or more error correction modes (e.g., C1 error correction mode, following by C2 correction mode if C1 error correction mode was unsuccessful). If such error correction mode(s) was/were unsuccessful, a conventional tape drive system is typically configured to immediately skip some length of its tape (e.g., numerous meters of the tape) to attempt to avoid this "bad" section of tape during a write operation to get back to a usable section of tape (though during a read operation a skipping mechanism like this is not executed, as it defeats the purposes of reading the data even if it is on a bad section of tape).

Conversely, while such solutions are still possible (and are consistent with this disclosure when other solutions do not suffice), tape drive 100 may be additionally or alternatively use tension controller 110 to fix this situation. For example, tension sensor 116 may measure the tension during these respective read or write procedures and therein communicate with motor 120 to adjust roller 112D to ensure that the tension of tape 102 is at an appropriate level. By causing motor 120 to dynamically adjust roller 112D to an appropriate tension while motor 126 is adjusting head 122 to be in an appropriate position for read/write operations, an ability of tape drive 100 to have increased performance improves. For example, a feedback loop may be created between tension controller 110 and head 122 so that specific tensions may be achieved for a specific read or write process (e.g., where a specific read or write process has a particular tension desired, and/or a smaller range of allowable tension).

When workable values are found (e.g., a value of a tension as provided by a value of a position of roller 112D in conjunction with a value of a position of head 122 along range 124), these values are stored in cartridge memory 108. Accordingly, during a subsequent load of tape drive 100, these values may be loaded from cartridge memory 108 to improve a likelihood of successful mount. Further, relevant detected performance metrics may be stored as associated with these values, such that tension controller 110 may determine not only which values avoid errors but also which values actively improve performance. In this way, during various operations (e.g., such as loading operations), tension controller 110 can read cartridge memory 108 values to determine the required/helpful tension values for different respective positions on tape 102. In response to determining these positions (as saved on cartridge memory 108), tension controller 110 will automatically cause motor 120 and roller 112D to achieve the respective tension value for the identified function at the respective tape 102 position (perhaps in conjunction with movements to head 122 as discussed herein).

Figure 2:
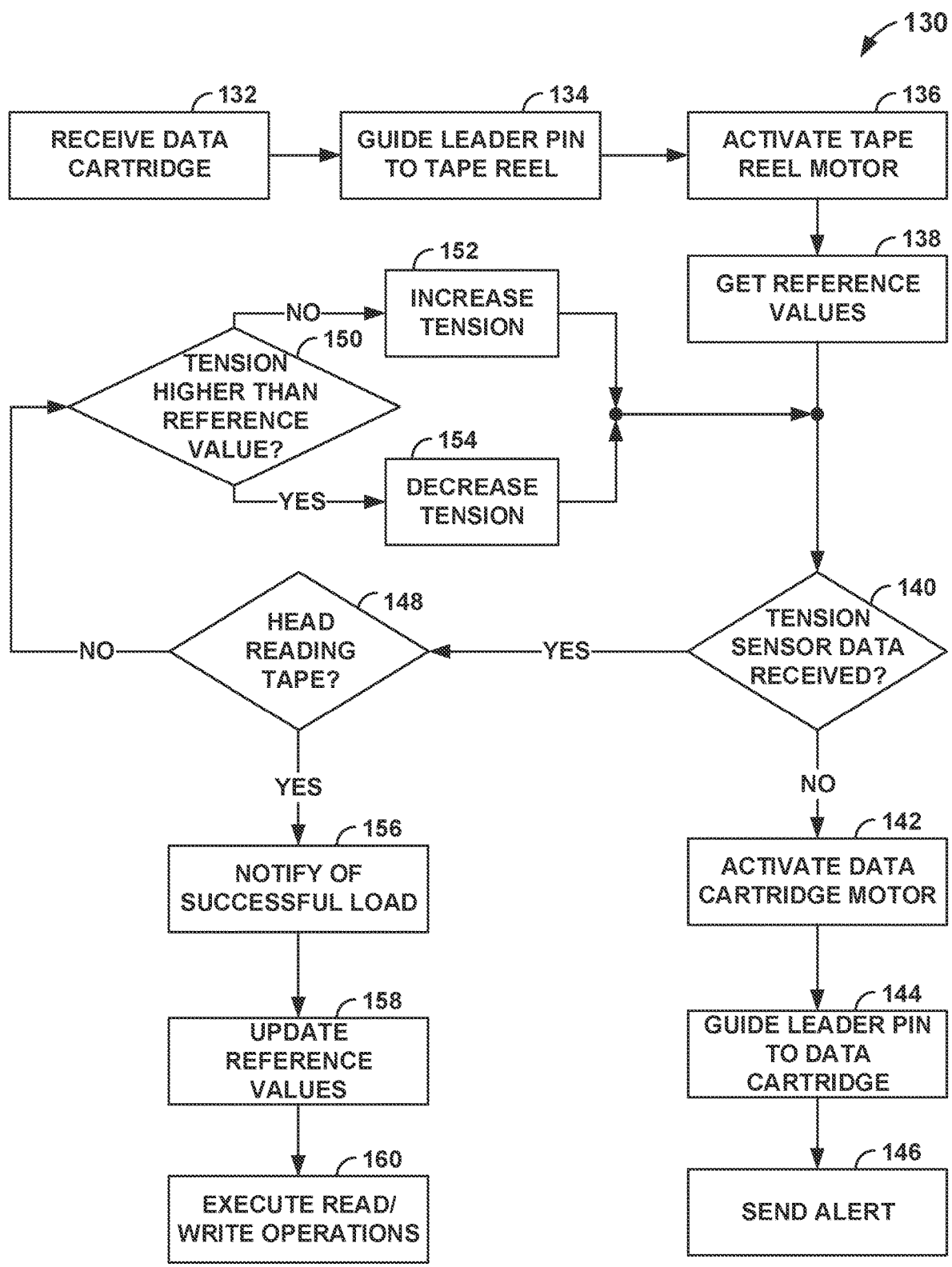
FIG. 2 depicts a flowchart by which the tension controller of FIG. 1 may manage loading the data cartridge of FIG. 1 into the tape drive of FIG. 1.
Figure 3:
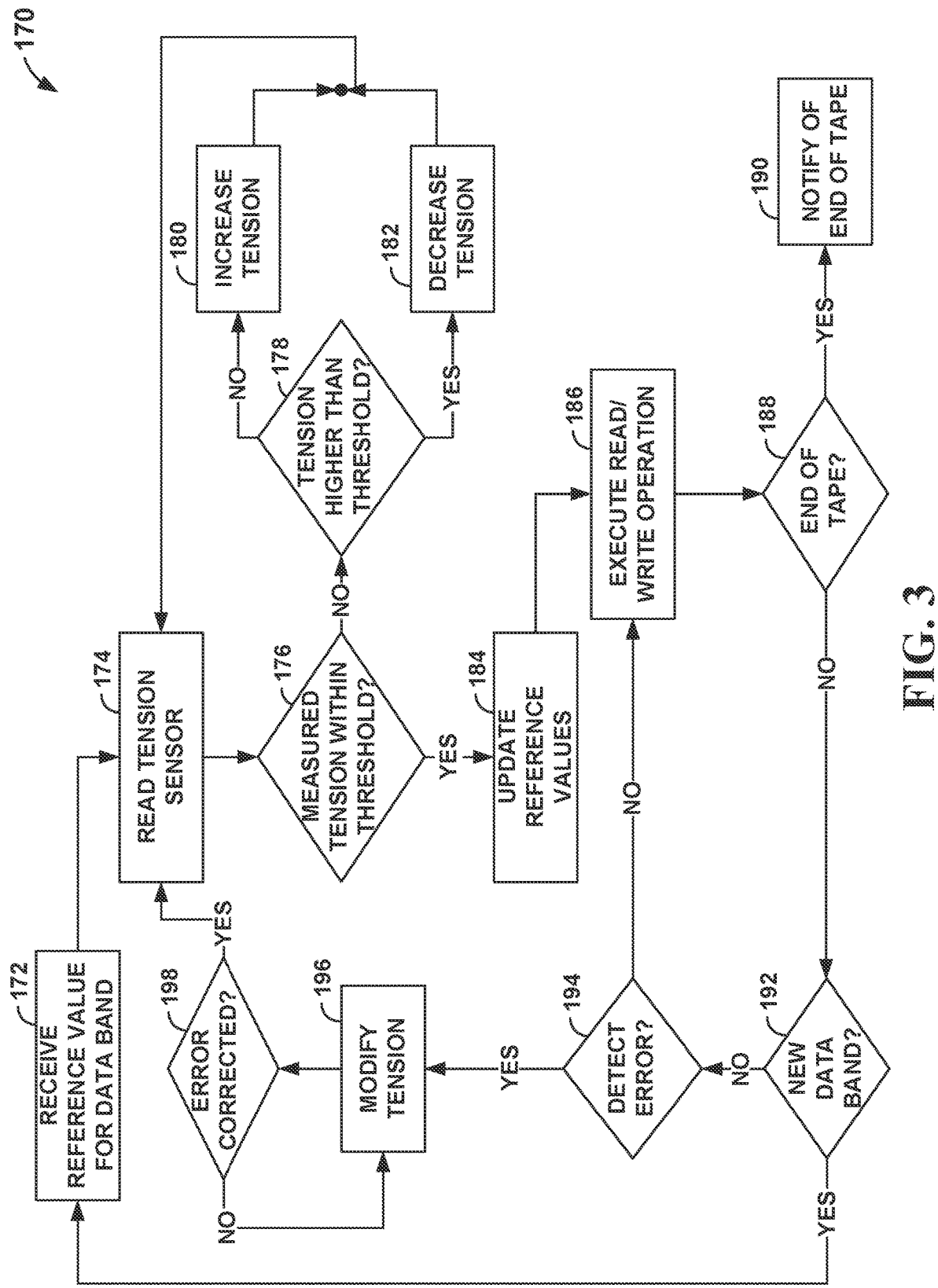
FIG. 3 depicts a flowchart by which the tension controller of FIG. 1 may manage tension of the tape during read/write operations.

Using these components, aspects of this disclosure may manage loading data cartridge 106 into tape drive 100 and also maintaining tension of tape 102 during read/write operations as discussed herein. In some examples, tension controller 110 (et al.) manages loading data cartridge 106 into tape drive according to flowchart 130 depicted in FIG. 2, and also manages tension of tape 102 during read/write operations according to flowchart 170 depicted in FIG. 3. Flowcharts 130, 170 of FIGS. 2, 3 are discussed with relation to FIG. 1 for purposes of illustration, though it is to be understood that other tension controllers of other tape drives may be used to execute flowcharts 130, 170 of FIGS. 2, 3 in other examples (e.g., such as tension controllers 210, 310, 410, 510 of tape drives 200, 300, 400, 500 described below). Further, in some examples tension controllers 110 of tape drive 100 execute a different method than flowcharts 130, 170 of FIGS. 2, 3, or tension controller 110 executes a similar method with more or less steps in a different order, or the like. Alternatively, or additionally, in some examples some or all functionality attributed below to tension controller 110 may be executed by numerous different devices of tape drive 100 (e.g., numerous control circuits working in conjunction), and/or by a device external to tape drive 100 (e.g., system 600 of FIG. 8).

Flowchart 130 starts with tape drive 100 receiving data cartridge 106 (132). Once received, leader pin assembly of tape drive 110 guides leader pin to tape reel 104 (134), at which point tape drive 100 activates a motor of tape reel 104 (136). Tension controller 110 may identify the reference values (138) as stored in cartridge memory 108 of data cartridge 106. For example, tension controller 110 may gather reference values such as a tension of tape 102, a relative position of adjustable roller 112D, a relative position of head 122, or the like Tension controller 110 may analyze whether or not tension data of tape 102 is received (140). For example, tension controller 110 may check a current tension level of tension sensor 116. If tension controller 110 is unable to gather a current tension of tape 102 ("no" branch from 140), that may indicate that tape 102 is not properly coupled between data cartridge 106 and tape reel 104. In response to this determination, tension controller 110 may activate data cartridge 106 motor (142) and guide leader pin back to data cartridge 106 (144). Tension controller 110 may further send an alert (146) notifying a user. For example, tension controller 110 may cause tape drive 100 to send a message to a user computing device (e.g., a laptop or personal computer or the like) that is coupled to tape drive 100, where this message includes a graphical message detailing the alert. Additionally, or alternatively, tension controller 110 may activate a light on a housing of tape drive 100 that relates to load failure, or may provide an audible error tone, or the like.

Where tension controller 110 receives tension from tension sensor 116 ("yes" branch from 140), tension controller 110 determines how head 122 is reading tape 102 (148). For example, tension controller 110 may determine whether or not head 122 is positioned to read the beginning of tape 102 as controlled by motor 126 and the tension of tape 102. Where tension controller 110 determines that head 122 is not reading tape 102 correctly ("no" branch from 148), tension controller 110 determines whether or not the measured tension is higher than the reference value (as stored in cartridge memory 108) (150). Where the measured tension is too low ("no" branch from 150), tension controller 110 increases a tension on tape 102 (152) and again checks if a tension data is received (140). Conversely, where tension controller 110 determines that the measured tension is too high ("yes" branch from 150), tension controller 110 decreases a tension on tape 102 (154) and checks if the tension data is received. In this way, tension controller 110 (in conjunction with other elements of tape drive 100) may check and ensure that data cartridge 106 is properly loaded into tape drive 100, and configure tape drive 100 to facilitate such a proper load.

Tension controller 110 may determine that head 122 is properly reading tape 102 ("yes" branch from 148), in response to which tension controller 110 provides a notification of a successful load (156). For example, tension controller 110 may cause tape drive 100 to send a message to an external computing device, and/or tension controller 110 may cause an indicating light (e.g., a green light-emitting-diode (LED)) to momentarily turn on at an external surface of tape drive 100 (to indicate a successful load). Tension controller 110 may further update reference values as saved in cartridge memory 108 (158). Updating reference values may include saving the current values (e.g., tape 102 tension values, a position of adjustable roller 112D, a position of head 122, etc.) to historical reference values of cartridge memory 108 to create a threshold of appropriate load values. Tension controller 110 may then enable tape drive 100 to execute read/write operations 160 according to flowchart 170 of FIG. 3.

Flowchart 170 begins with tension controller 110 receiving a reference value for a data band of tape 102 (172). For example, tape 102 may be divided into numerous portions for which different tensions and/or head 122 positions are optimal, such that tension controller 110 (and/or motor 126) is configured to shift a position of adjustable roller 112D (and/or head 122) as tape 102 travels during tape drive 100 during read/write operations. The reference values for respective data bands may be stored in cartridge memory 108. There may be any number of data bands for a single tape 102—for example, there could be one data band for a full tape 102, or there could be dozens of data bands (e.g., such that tension controller 110 is detecting and accounting for a new data band as discussed herein every few seconds). Specifically, aspects of this disclosure relate to tape 102 that has four data bands, where data bands at the beginning and end of tape 102 have tension thresholds that are relatively higher than the two middle data bands (e.g., such that a tension is relatively high at a beginning of tape 102 for a first data band, then it is lowered for two middle data bands, then is raised for final data band of tape 102).

Tension controller 110 reads tension sensor 116 to get a current tension of tape 102 (174), and then determines whether or not a current measured tension is within a threshold for this data band as established by the reference values (176). If tension controller 110 detects that the measured tension is outside of this threshold ("no" branch from 176), tension controller 110 determines whether or not the measured tension is higher than the threshold (178). If the tension is too high ("yes" branch from 178), tension controller 110 adjusts roller 112D to decrease tension (182), otherwise if the tension is too low ("no" branch from 178) tension controller 110 increases the tension on tape 102 (180). Tension controller 110 may stay within a loop (174-182) in checking whether tension is within the thresholds (potentially adjusting and readjusting roller 112D until it is) until the measured tension is within this threshold ("yes" branch from 176).

Tension controller 110 then updates the reference values stored within cartridge memory 108 (184). In some examples, tension controller 110 may further write any detected performance of tape drive 100 (e.g., a performance that occurred during the most recent read/write operations) into cartridge memory 108, so that there is a record of how different reference values performed over time. In this way there may be a consistent record of the measured tensions that are within thresholds, potentially tracking any trend or the like (and reacting accordingly). Tension controller 110 may then enable tape drive 100 to execute read/write operations (186). For example, tension controller 110 may enable head 122 to execute read/write operations using read/write elements of head 122 as would be understood by one of ordinary skill in the art.

Tension controller 110 determines whether or not tape drive 100 has gotten to an end of tape 102 (188). For example, tension controller 110 may determine whether or not there is another read/write operation scheduled/requested for tape 102, and/or tension controller 110 may determine whether or not there is any more tape 102 that may be written to/read. Where tension controller 110 determines that head 122 is at the end of tape 102 ("yes" branch from 188), tension controller 110 provides a notification that tape drive 100 is at the end of tape 102 (190). Tension controller 110 may notify a user that tape drive 100 is at an end of tape 102 via a computing message (e.g., such that tape drive 100 sends a message that causes a user interface (UI) to indicate that tape drive 100 is at an end), or the notification may consist of an LED light or an audible tone or the like.

Where tension controller 110 determines that tape 102 is not at its end ("no" branch from 188), tension controller 110 may determine whether or not tape 102 is at a new data band (192). For example, the location and existence of data bands of tape 102 may be stored in data cartridge memory 108, such that tension controller 110 may determine that a current length of tape 102 (e.g., a spot of tape 102 that is currently at head 122) is at a final portion of a current band, such that the next portion of tape 102 to be read/written to will be of a new data band. Where tension controller 110 does detect a new data band ("yes" branch from 192), tension controller 110 may receive the reference value for this new data band (172) to continue the process.

Where tension controller 110 does not detect a new data band, tension controller 110 determines whether or not there are any current errors (194), such as a high amount of C1/C2 error corrections. For example, tension controller 110 may check whether or not there are any read or write errors (e.g., as detected/reported by head 122). Where tension controller 194 does not detect any errors ("no" branch from 194), tension controller 110 may enable/allow the continued execution of read/write operations. In this way, flowchart 170 includes a loop 186, 188, 192, 194 that may repeat as read/write operations continue until something warrants change.

If tension controller 110 detects an error ("yes" branch from 194), or reaches a defined threshold of C1/C2 corrections (e.g., as would be understood by one of ordinary skill in the art, C1/C2 corrections are not necessarily indicative of an error, but C1/C2 corrections may decrease the overall tape drive 100 read/write performance, such that reducing their frequency via tension management may improve a general performance of tape drive 100), tension controller 110 may modify tension of tape (196). For example, depending upon the error, tension controller 110 may increase the tension or decrease the tension. Once modified, tension controller 110 may check to see if the error has been corrected (198). If the error has not been corrected ("no" branch from 198), tension controller 110 may again modify the tension (196) and recheck the error (198) as part of a mini-loop to correct the error. In some examples (not depicted), tension controller 110 may only execute this loop of modifying the tension (196) and determining whether or not the error is corrected (198) a threshold number of times (e.g., five times, ten times, twenty times) before sending an alert to a user as described herein, and stopping this mini-loop. If the error has been corrected ("yes" branch from 198), tension controller 110 reads tension sensor 116 and (so long as the measured tension is within the threshold per the "yes" branch from 176) updates the reference values (184) prior to continuing the ongoing execution of read/write operations.

In other examples, some components of tape drives configured to manage the tension of tape may be arranged differently, or may be added or removed, relative to tape drive 100 of FIG. 1. For example, FIGS. 4, 5, 6, and 7 relate to tape drives 200, 300, 400, and 500 (collectively referred to as tape drives 200-500), each of which are to be understood to be substantially similar to tape drive 100 with the exception of any differences described below. For example, tape drives 200-500 include respective tape 202, 302, 402, 502, tape reels 204, 304, 404, 504, data cartridge 206, 306, 406, 506 with respective cartridge memory 208, 308, 408, 508, tension controllers 210, 310, 410, 510, rollers 212A-212D (collectively, "rollers 212"), 312A-312D (collectively, "rollers 312"), 412A-412D (collectively, "rollers 412"), 512A-512D (collectively, "rollers 512"), head 222, 322, 422, 522, one or more tension sensors 216, 316, 416A-416B (collectively, "tension sensors 416"), 516, while tape drives 200, 300, 500 further have motor 220, 320, 520 to move respective rollers along path 214, 314, 514, where each of these is to be understood to be substantially similar to respective elements from FIG. 1 except for the differences described below.

Figure 4:
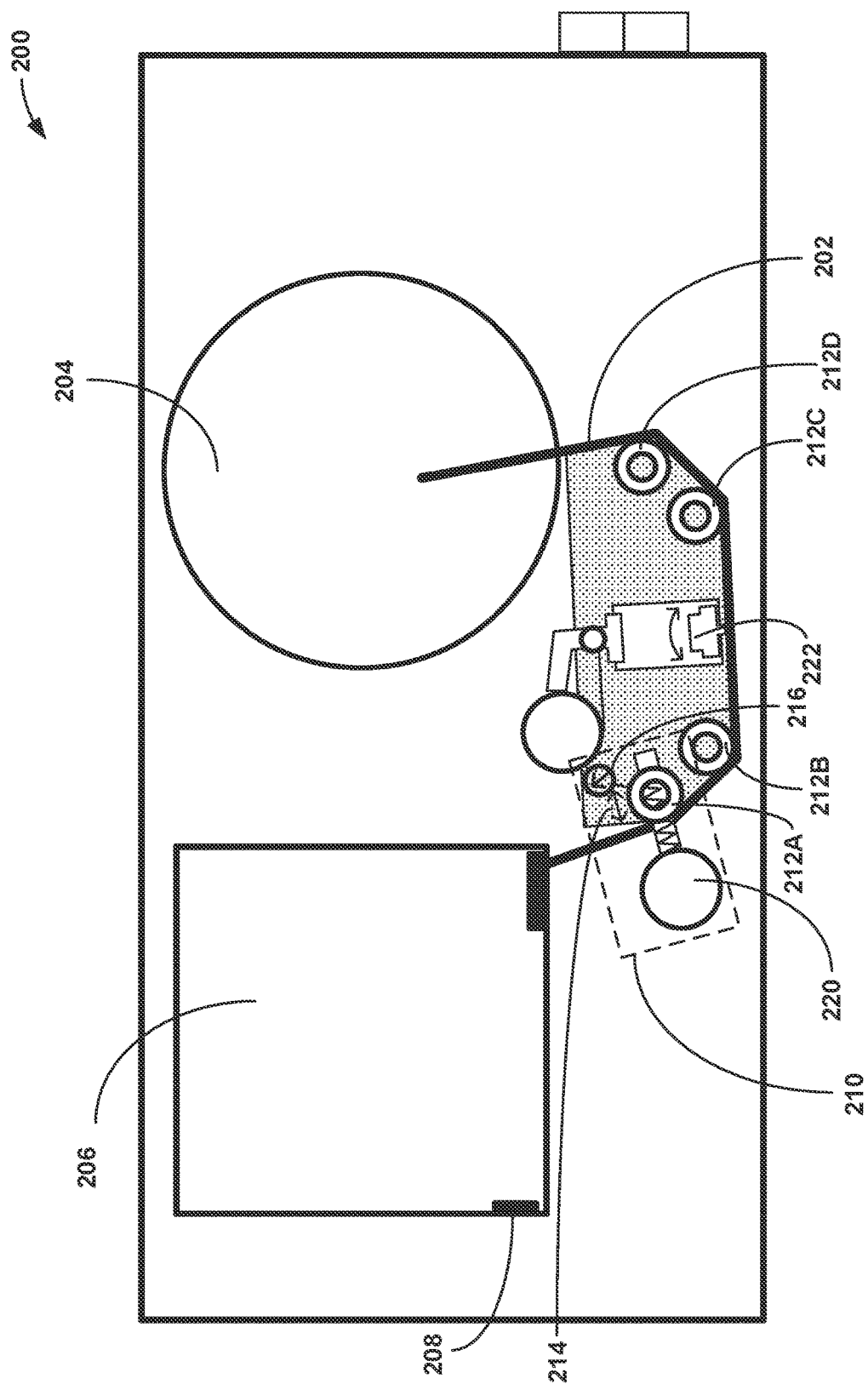
FIG. 4 depicts a conceptualized schematic internal view of a tape drive configured to measure the tension of a tape and modulate the tension of the tape via an adjustable roller adjacent the data cartridge.

For example, FIG. 4 depicts tape drive 200 in which tension controller 210 is coupled to roller 212A between data cartridge 206 and head 222 so that motor 220 may move adjustable roller 212A along path 214. As depicted, tension controller 210 (including tension sensor 216, motor 220, and adjustable roller 212A) is adjacent data cartridge 206 (rather than tension controller 110 being adjacent tape reel 104 as depicted in FIG. 1) such that tension controller 110 receives tape 202 as it exits from data cartridge 206. By positioning tension controller 210/motor 210/adjustable roller 212A adjacent data cartridge 206 and "prior" to at head 222, tension controller 210 may improve a likelihood of tape 202 being loaded correctly before getting to the read/write elements of head 222.

Figure 5:
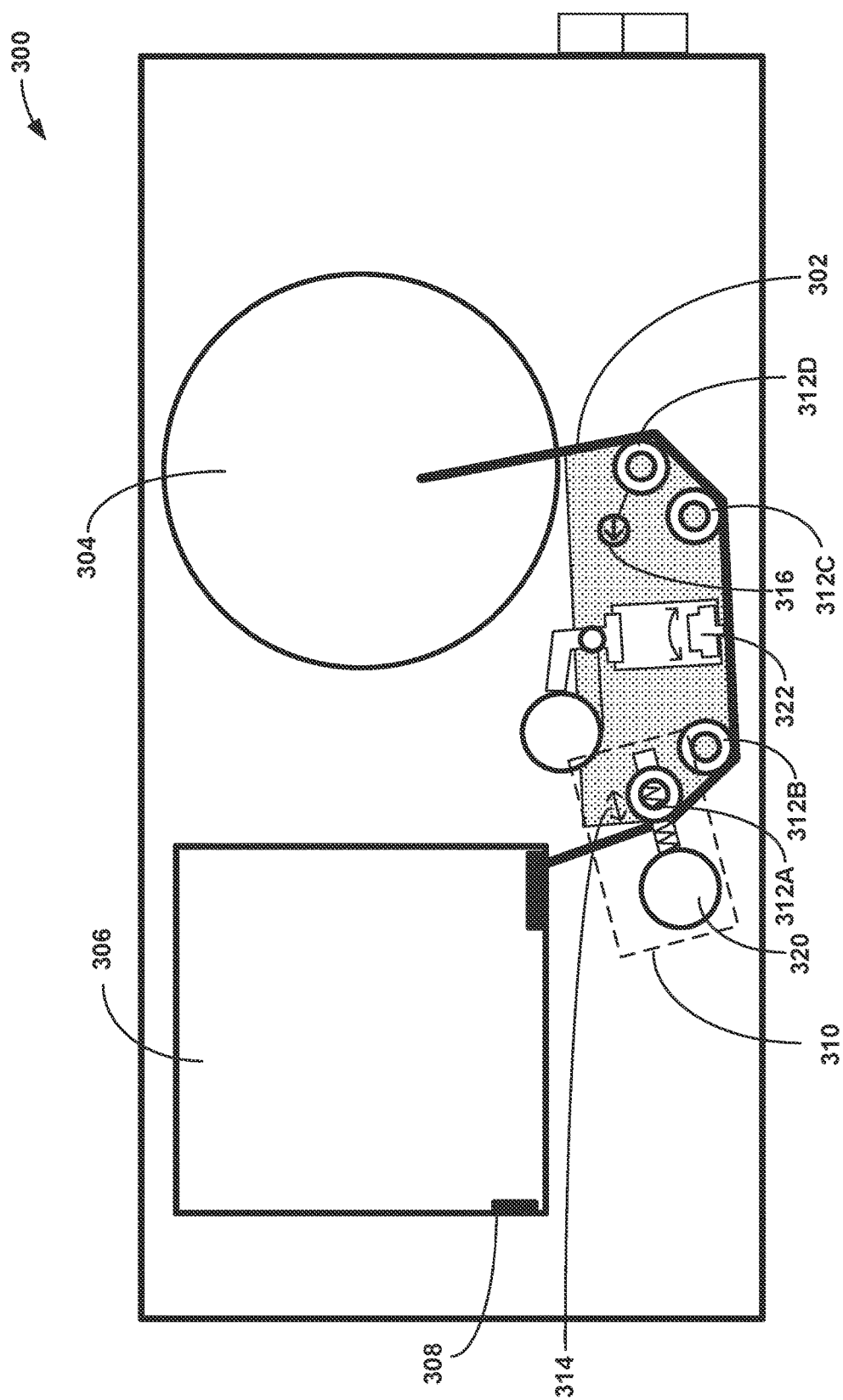
FIG. 5 depicts a conceptualized schematic internal view of a tape drive configured to measure the tension of a tape via a tape tension at one roller and modulate the tension of the tape via another roller that is adjustable.

For another example, FIG. 5 depicts tape drive 300 in which tension sensor 316 is coupled to roller 312D that is not configured be adjusted along path 314. Rather, as depicted tension controller 310 is configured to cause roller 312A to be adjusted along path 314 via motor 320 in response to tension measured via tension sensor 316. Though tension sensor 316 is depicted as mounted on roller 312D, tension sensor could be alternatively or additionally mounted to each/any of rollers 312B, 312C in different embodiments. Accordingly, tension sensor 316 may be mounted on whichever of rollers 312 has the most convenient geometry in different embodiments.

Figure 6:
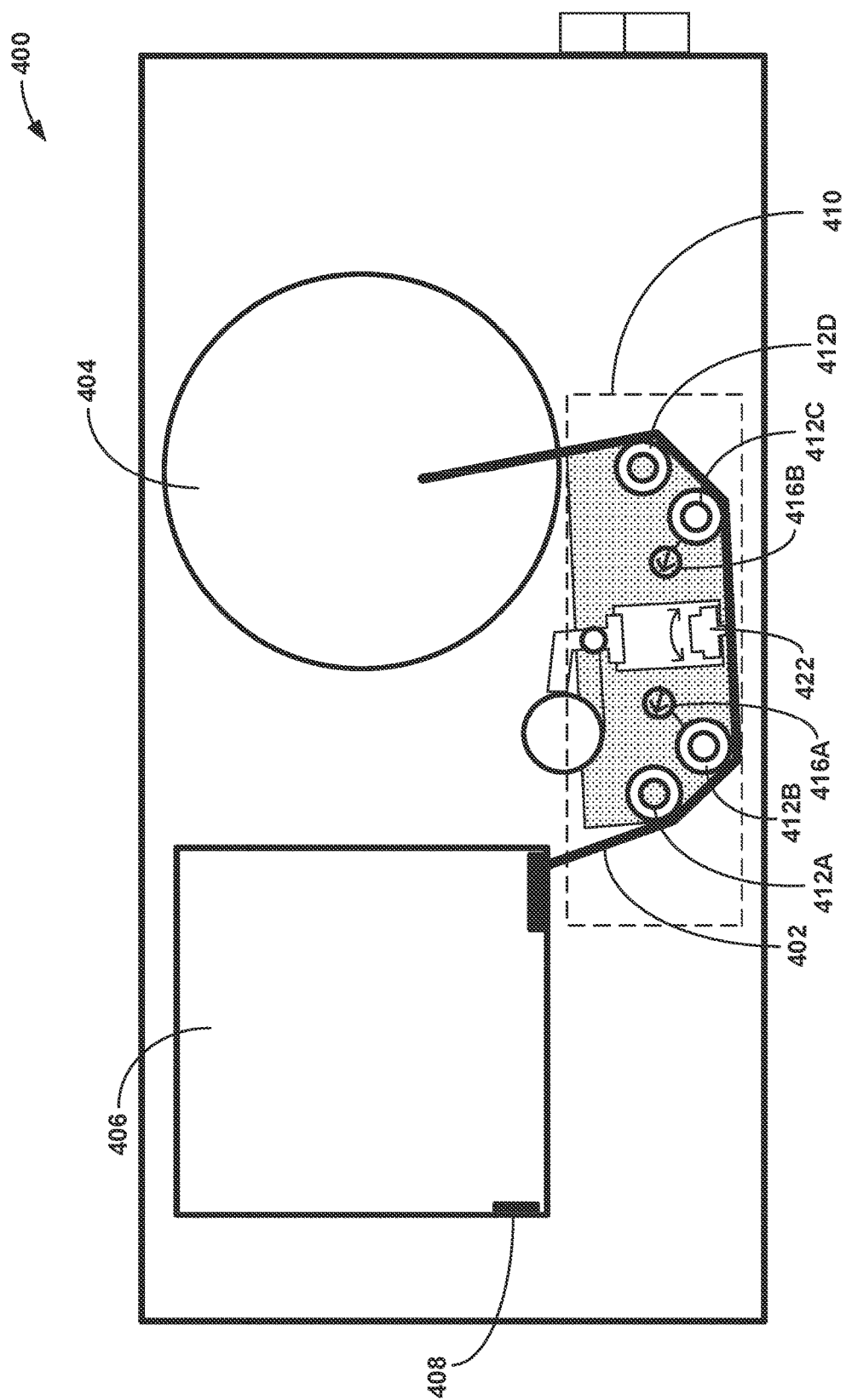
FIG. 6 depicts a conceptualized schematic internal view of a tape drive configured to measure the tension of a tape via a tape tension at one roller and modulate the tension of the tape via motors of the tape reel and data cartridge.

For another example, FIG. 6 depicts tape drive 400 in which tension controller 410 does not include a respective motor or adjustable roller that may move along a respective path. Rather, tension controller 410 includes dual tension sensors 416 and/or control circuitry (not depicted). For example, tension controller 410 may use one of sensors 416 to control tape 402 going in a first direction, and tension controller 410 may use another of sensors 416 to control tape 402 going in a second direction. Specifically, tension controller 410 may cause a first motor within data cartridge 406 that is configured to pull tape 402 into data cartridge 406 to increase (or decrease) a tension in tape 402, while tension controller 410 causes a second motor within tape reel 404 that is configured to pull tape 402 into tape reel 404 to decrease (or increase) a tension in tape 402, or the like. In this way, tension controller 410 may cause motors to work in conjunction to impact a tension as described herein.

Figure 7:
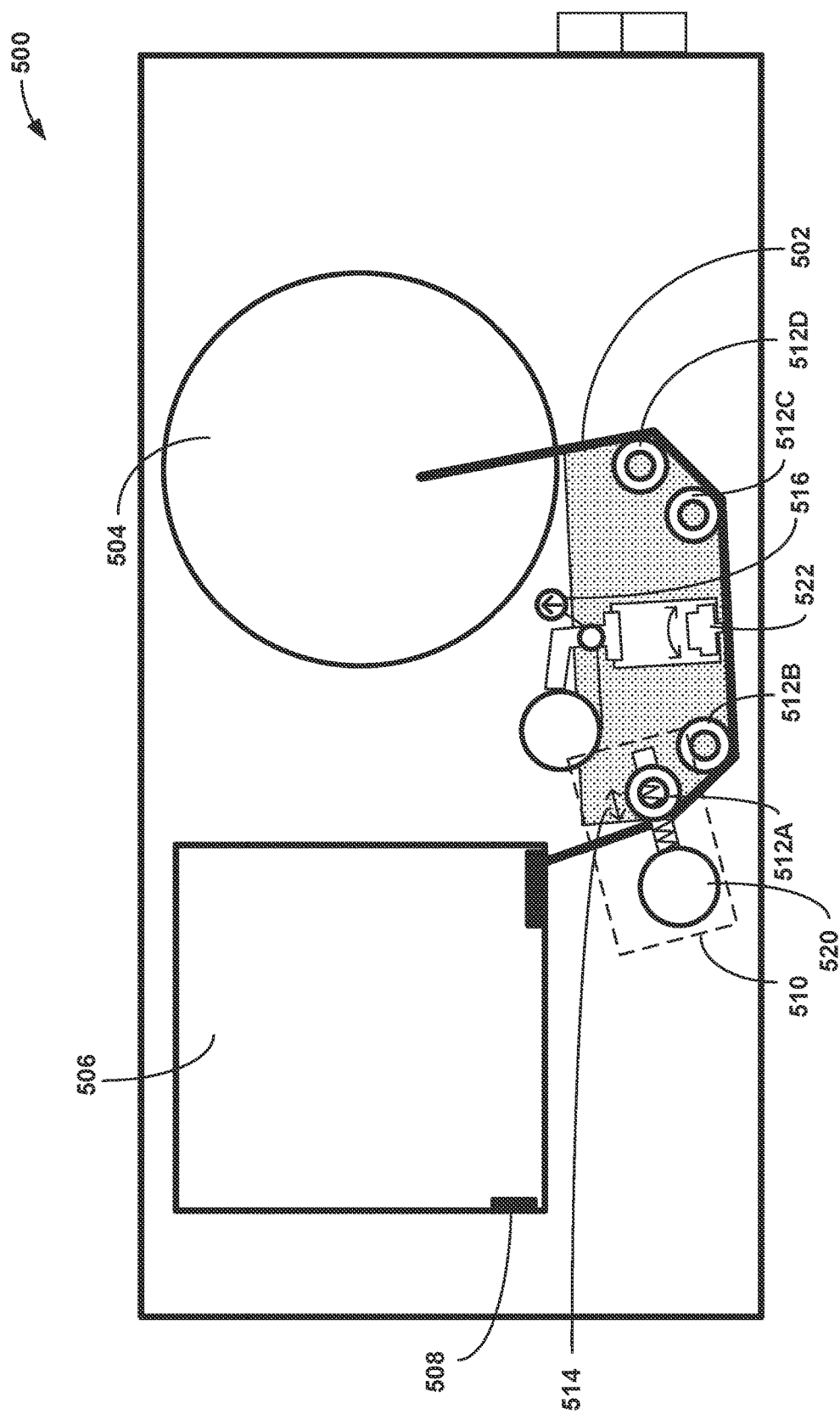
FIG. 7 depicts a conceptualized schematic internal view of a tape drive configured to measure the tension of a tape via a tape tension at a head with read/write elements and modulate the tension of the tape via an adjustable roller

For another example, FIG. 7 depicts tape drive 500 in which tension sensor 516 is coupled to head 522. Tension sensor 516 is configured to measure a tension of tape 502 as head 522 interacts with tape 502 going across read/write elements of head 522. Once measured, as depicted tension controller 510 is configured to cause roller 512A to be adjusted along path 514 via motor 520 in response to tension measured via tension sensor 516.

Figure 8:
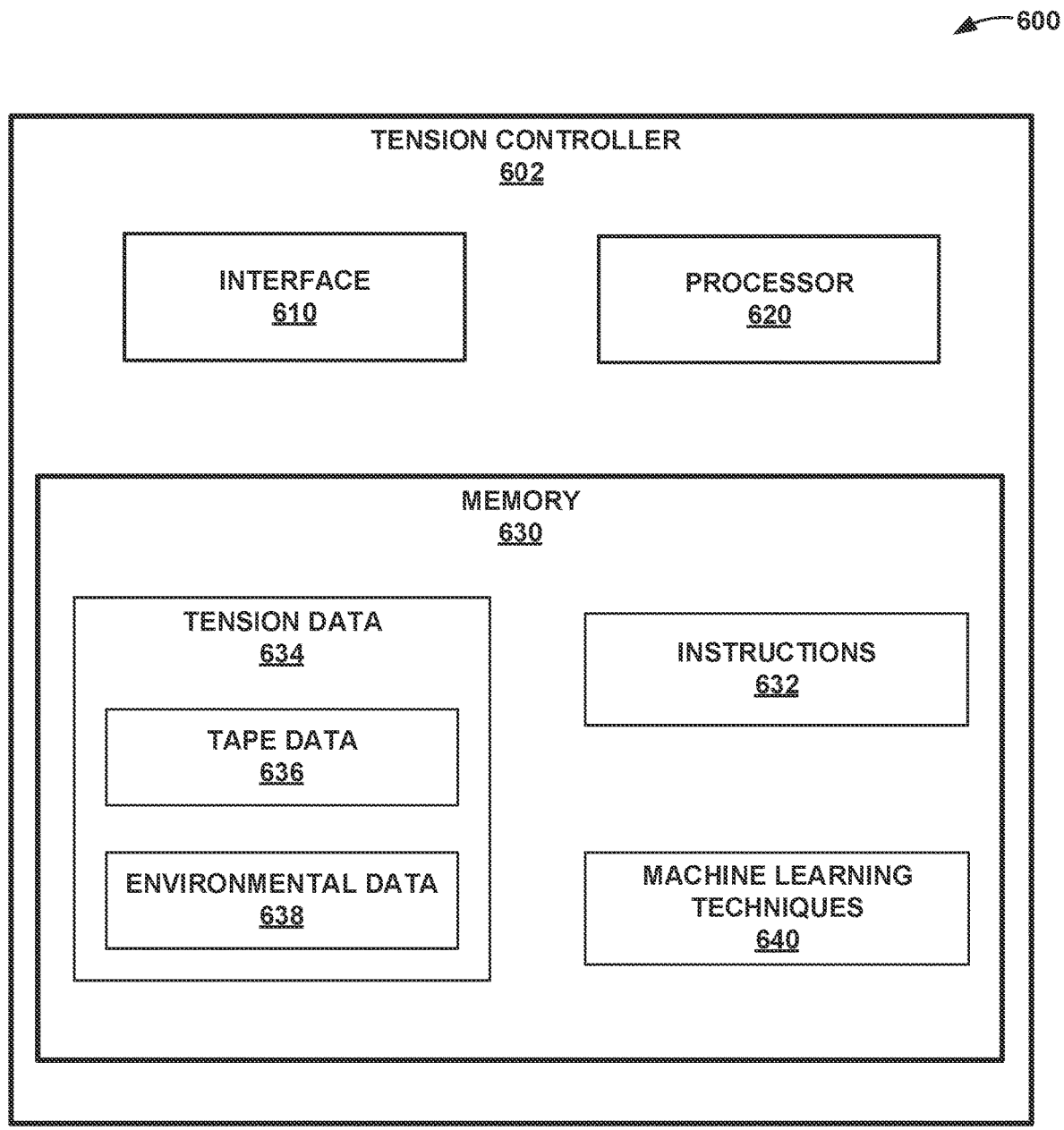
FIG. 8 depicts a conceptual box diagram of example components of a computing device that may execute some functionality attributed to the tension controller of FIG. 1.

As described above, logic for managing tension of tape of a tape drive during both the loading of a data cartridge and also during read/write operations may be done via a computing device that includes a processor configured to execute instructions stored on a memory. For example, FIG. 8 is a conceptual box diagram of such computing system 600. As depicted, the computing system 600 may be tension controller 602, such that in some examples tension controller 110, 210, 310, 410, 510 includes some or all components of computing system 600. In other examples, in addition to control circuitry within a tape device executing the functionality described above (or alternative to the control circuitry within the tape device executing such functionality), this functionality may be provided by computing device 600 that is fully external to a tape drive. While computing system 600 is depicted as a single entity (e.g., within a single housing) for the purposes of illustration, in other examples, computing system 600 may include two or more discrete physical systems (e.g., within two or more discrete housings). Computing system 600 may include interfaces 610, processor 620, and memory 630. Computing system 600 may include any number or amount of interface(s) 610, processor(s) 620, and/or memory(s) 630.

Computing system 600 may include components that enable computing system 600 to communicate with (e.g., send data to and receive and utilize data transmitted by) devices that are external to computing system 600. For example, computing system 600 may include interface 610 that is configured to enable computing system 600 and components within computing system 600 (e.g., such as processor 620) to communicate with entities external to computing system 600. Specifically, interface 610 may be configured to enable components of computing system 600 to communicate with tape drive 100 (e.g., through drive ports 128) where computing system 600 provides functionality of tension controller 110, or the like. Interface 610 may include one or more network interface cards, such as Ethernet cards and/or any other types of interface devices that can send and receive information. Various numbers of interfaces may be used to perform the described functions according to particular needs.

As discussed herein, computing system 600 may be configured to manage tape tension during an operation loading data cartridge and/or during read/write operations. Computing system 600 may utilize processor 260 to thusly manage tape tension. Processor 620 may include, for example, microprocessors, digital signal processors (DSPs), application specific integrated circuits (ASICs), field-programmable gate arrays (FPGAs), and/or equivalent discrete or integrated logic circuits. Two or more of processor 620 may be configured to work together to manage tape tension accordingly.

Processor 620 may manage tape tension according to instructions 632 stored on memory 630 of computing system 600. Memory 630 may include a computer-readable storage medium or computer-readable storage device. In some examples, memory 630 includes one or more of a short-term memory or a long-term memory. Memory 630 may include, for example, random access memories (RAM), dynamic random-access memories (DRAM), static random-access memories (SRAM), magnetic hard discs, optical discs, floppy discs, flash memories, forms of electrically programmable memories (EPROM), electrically erasable and programmable memories (EEPROM), or the like.

In addition to instructions 632, in some examples gathered or predetermined data or techniques or the like as used by processor 620 to manage tape tension as described herein is stored within memory 630. For example, memory may also tension data 634, which may include tape data 636 and environmental data 638. For example, as discussed herein in some examples environmental data (e.g., temperature, humidity, or the like) may impact an allowable/desirable tape tension, such that storing historical environmental data 638 and current environmental data 638 may improve an ability to manage the tape tension as described herein. Furthermore, tape data 636 may include different data bands and respective reference values thereof (e.g., an acceptable bandwidth of tension for this tape data band, and/or an acceptable head position for this data band).

Memory 230 may further include machine learning techniques 640 that computing system 600 may use to improve a process of managing tape tension as discussed herein over time. Machine learning techniques 640 can comprise algorithms or models that are generated by performing supervised, unsupervised, or semi-supervised training on a dataset, and subsequently applying the generated algorithm or model managing tape tension. For example, using machine learning techniques 640, computing system 600 may determine that certain tensions thresholds for certain tapes when combined with certain head positions cause more or less C1/C2 corrections errors (e.g., as identified by C1/C2 corrections) during read/write operations and/or during a cartridge load operation, and may therefore update rules to assume these tensions/head positions for some or all tapes accordingly. Computing system 600 may reinforce rules over time based on whether a performance and stability of tape drive usage improves over time. For example, computing system 600 may track whether or not any whether or not read/write errors occur more or less with certain types of thresholds (that are calculated to be within an acceptable threshold) within respective time windows, and change various thresholds accordingly (e.g., tracking that tensions that are on a low end of what is categorized as an allowable tension bandwidth result in relatively less read/write errors, such that the allowable tension bandwidth is changed to disallow the high end of this bandwidth or to move the whole bandwidth further "down").

Machine learning techniques 640 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

For example, machine learning techniques 640 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), Bayesian network (BN), classification and regression tree (CART), chi-squared automatic interaction detection (CHAID), expectation-maximization algorithm, feed-forward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-situation data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:
1. A tape drive comprising:
   a plurality of rollers spatially arranged within the tape drive to define a route for tape of a received data cartridge to travel from the received data cartridge to a tape reel;
   a head with read elements and write elements configured to read from and write to the tape as tape of the received data cartridge travels along the route;
   a tension sensor configured to measure tension of the tape as it travels along the route; and
   control circuitry configured to:
      read, prior to a leader pin assembly guiding the tape to the tape reel, a set of reference values of a cartridge memory of the received data cartridge to determine a tension threshold for the tape and a configuration of the head for the tape; and
      cause both a motor to impact the tension to keep the tape within the tension threshold and the head to be configured according to the configuration as the leader pin assembly guides the tape to the tape reel.

2. The tape drive of claim 1, wherein the motor moves one of the plurality of rollers along a predefined route to change the route to impact the tension.

3. The tape drive of claim 2, further comprising a spring that couples the motor to the one roller, such that the motor moves the one roller via the spring.

4. The tape drive of claim 3, wherein the one roller is adjacent the tape reel.

5. The tape drive of claim 3, wherein the one roller is adjacent the data cartridge.

6. The tape drive of claim 2, wherein the tension sensor is secured to the one roller.

7. The tape drive of claim 2, wherein the tension sensor is secured to the head.

8. The tape drive of claim 2, wherein the tension sensor is secured to another roller of the plurality of rollers.

9. The tape drive of claim 1, wherein the control circuitry is further configured to:
  detect an error related to a read or write operation of the head;
  determine, based on the set of reference values, how to respond to the error; and
  cause the motor to impact the tension of the tape according to the set of reference values to address the error.

10. The tape drive of claim 1, wherein the motor includes a tape reel motor, wherein the control circuitry is configured to cause the tape reel motor and a motor of the received data cartridge to work in conjunction to impact the tension.

11. A method comprising:
  receiving a data cartridge into a tape drive that includes a plurality of rollers spatially arranged within the tape drive to define a route from the received data cartridge to a tape reel of the tape drive such that tape of the data cartridge travels along the route past a head with read elements and write elements;
  reading, prior to a leader pin assembly guiding the tape to the tape reel, a set of reference values of a cartridge memory of the received data cartridge to determine a tension threshold for the tape and a configuration of the head for the tape;
  measuring, using a tension sensor of the tape drive, a tension of the tape as it travels along the route; and
  causing, by control circuitry of the tape drive and in response to sensing the tension, both a motor of the tape drive to impact the tension to keep the tape within the tension threshold and the head to be configured according to the configuration as the leader pin assembly guides the tape to the tape reel.

12. The method of claim 11, wherein the motor impacts the tension by moving one of the plurality of rollers along a predefined route.

13. The method of claim 11, wherein the motor includes a tape reel motor and impacting the tension includes causing the tape reel motor and a motor of the received data cartridge to work in conjunction to impact the tension.

14. The method of claim 11, the method further comprising:
  detecting an error related to a read or write operation of the head;
  gathering a set of reference values of the cartridge memory of the received data cartridge to determine how to respond to the error; and
  causing the motor to impact the tension of the tape according to the set of reference values to address the error.

15. A system comprising:
a processor; and
a memory in communication with the processor, the memory containing instructions that, when executed by the processor, cause the processor to:
  receive a data cartridge into a tape drive that includes a plurality of rollers spatially arranged within the tape drive to define a route from the received data cartridge to a tape reel of the tape drive such that tape of the data cartridge travels along the route past a head with read elements and write elements;
  read, prior to a leader pin assembly guiding the tape to the tape reel, a set of reference values of a cartridge memory of the received data cartridge to determine a tension threshold for the tape and a configuration of the head for the tape;
  measure, using a tension sensor of the tape drive, a tension of the tape as it travels along the route; and
  cause, by control circuitry of the tape drive and in response to sensing the tension, both a motor of the tape drive to impact the tension to keep the tape within the tension threshold and the head to be configured according to the configuration as the leader pin assembly guides the tape to the tape reel.

16. The tape drive of claim 1, wherein the control circuitry is further configured to update the set of reference values in response determining that the head is properly reading the tape.

17. The tape drive of claim 1, wherein the control circuitry is further configured to determine that a current length of the tape is at a final portion of a current band.

18. The tape drive of claim 17, wherein the control circuitry is further configured to, in response to detecting a new data band when the current length of the tape is at the final portion of the current band, receive a set of reference values for the new data band to determine a new tension threshold for the new data band.

19. The tape drive of claim 17, wherein the control circuitry is further configured to, in response to determining that there is not a new data band when the current length of the tape is at the final portion of the current band, determine whether there are any current errors.

20. The tape drive of claim 9, wherein the control circuitry is further configured to update the set of reference values in response to determining that the error has been corrected.

* * * * *